United States Patent [19]

Happel et al.

[11] 4,128,924

[45] Dec. 12, 1978

[54] LAMINATED SEAT BELT BUCKLE

[75] Inventors: Hermann E. Happel; James R. Anthony, both of Indianapolis, Ind.

[73] Assignee: Indiana Mills & Manufacturing Inc., Carmel, Ind.

[21] Appl. No.: 769,722

[22] Filed: Feb. 17, 1977

Related U.S. Application Data

[63] Continuation-in-part of Ser. No. 685,332, May 11, 1976, abandoned.

[51] Int. Cl.² ............................................. A44B 11/26
[52] U.S. Cl. .............................. 24/230 AL; 24/205.18; 200/61.58 B
[58] Field of Search .................................. 24/230 AL

[56] References Cited

U.S. PATENT DOCUMENTS

| | | | |
|---|---|---|---|
| 3,203,065 | 8/1965 | Hoppenstand | 24/230 AL |
| 3,522,640 | 8/1970 | Lohr | 24/230 AL |
| 3,760,467 | 9/1973 | Lohr | 24/230 AL |
| 3,807,000 | 4/1974 | Weman | 24/230 AL |
| 3,911,236 | 10/1975 | Poulsen | 24/230 AL |
| 3,969,795 | 7/1976 | Stephenson | 24/230 AL |
| 4,027,362 | 6/1977 | Hart | 24/230 AL |

Primary Examiner—Bernard A. Gelak

Attorney, Agent, or Firm—Woodard, Weikart, Emhardt & Naughton

[57] ABSTRACT

A seat belt buckle having a laminated construction. A main body has a cavity in which a double leaf spring is positioned. A latch plate located in the cavity has a pair of outwardly extending arms slidably mounted in a pair of mutually-opposed upright channels mounted in the cavity. The leaf spring abuts the bottom surface of the latch plate forcing the latch plate upwardly to releasably lock in place a seat belt tongue extending through inlet means into the cavity atop the latch plate. A push button is mounted between the main body and a cover fixedly secured to the main body. The push button has outwardly extending legs slidably received in the channels and abutting the arms on the latch plate whereby the push button may be depressed to move the latch plate and leaf or coil spring downwardly releasing the tongue from the buckle. A first reinforcing plate is mounted in a recess on the main body whereas a second reinforcing plate is mounted in a recess within the cover. Fastening means secure together and extend through the cover, the main body and the reinforcing plates. Lateral force exerted on the latch plate by the tongue is transferred to the channels and thus to the reinforcing plates, cover and main body.

4 Claims, 12 Drawing Figures

LAMINATED SEAT BELT BUCKLE

CROSS REFERENCE TO RELATED APPLICATION

This application is a continuation-in-part of our application, Ser. No. 685,332, filed May 11, 1976 now abandoned.

BACKGROUND OF THE INVENTION

1. Field of the Invention

This invention is in the field of seat belt buckles used in a variety of vehicles for securing occupants therein.

2. Description of the Prior Art

A great variety of seat buckles have been devised and patented for use in a variety of applications. In U.S. Pat. No. 3,760,467 there is disclosed a push button seat belt buckle wherein a latch plate is slidably mounted in a pair of channels secured within the main buckle housing. A helical spring is provided on one side of the latch plate whereas a push button is provided on the opposite side of the latch plate to allow control of movement of the latch plate which engages and disengages a tongue inserted into the cavity of the buckle housing. The housing disclosed in the aforementioned patent may be cast in metal.

In order to produce a low-cost seat belt buckle, the buckle housing should be produced from plastic in lieu of metal. A problem with the prior plastic buckles is the failure of the plastic buckle housing when subjected to the various load tests that are required prior to installation of the buckle in a vehicle. A pair of metal reinforcing plates are positioned within the buckle housing disclosed herein to provide the necessary strength and to prevent the buckle from failing during load tests. The buckle is designed so as to transfer the lateral force exerted by the tongue through a movable latch plate and onto a pair of upright panels which in turn transfer the force onto the reinforcing plates fixedly secured to the plastic buckle housing. Thus, failure of the housing is prevented while simultaneously providing an attractive, low-cost buckle. Other patents of interest are the U.S. Pat. Nos. 3,911,236, which discloses a laminated buckle, and 3,807,000 which discloses a leaf spring for urging a latch plate into engagement with the buckle tongue.

SUMMARY OF THE INVENTION

One embodiment of the present invention is a laminated seat belt buckle comprising a main body having a cavity therein and entrance means opening into the cavity, a cover fixedly mounted to the main body with the cover having a hole opening into the cavity, a first reinforcing plate fixedly mounted between the main body and the cover, the plate being sized and configured relative to the main body and the cover preventing relative motion therebetween, the plate including a pair of channels, fastening means extending through and fixedly securing together the main body, the cover and the plate, a latch plate disposed in the cavity and having a pair of outwardly-extending arms, the plate having an outwardly-disposed catch engageable with a seat belt tongue inserted into the cavity through the entrance means, the arms being slidably mounted in the channels transferring lateral force on the catch exerted by the tongue onto the first plate, spring means within the cavity engaged with the latch plate and being operable to releasably urge the latch plate into the latching engagement with the tongue, a push button positioned between the cover and the first reinforcing plate, the push button having a pair of legs extending against and atop the arms of the latch plate, the push button being accessible via the hole to allow the button to be pushed downward moving the spring means and disengaging the latch plate from the tongue. A further embodiment of the invention utilizes dual catches on the latch plate and a divided opening into the body cavity for accomodating dual seat belt tongues.

It is an object of the present invention to provide a new and improved laminated seat belt buckle.

It is a further object of the present invention to provide a seat belt buckle having a plastic housing with metal reinforcing plates.

Yet another object of the present invention is to provide a new and improved seat belt buckle.

Related objects and advantages of the present invention will be apparent from the following description.

DESCRIPTION OF THE PREFERRED EMBODIMENTS

Figure 1:
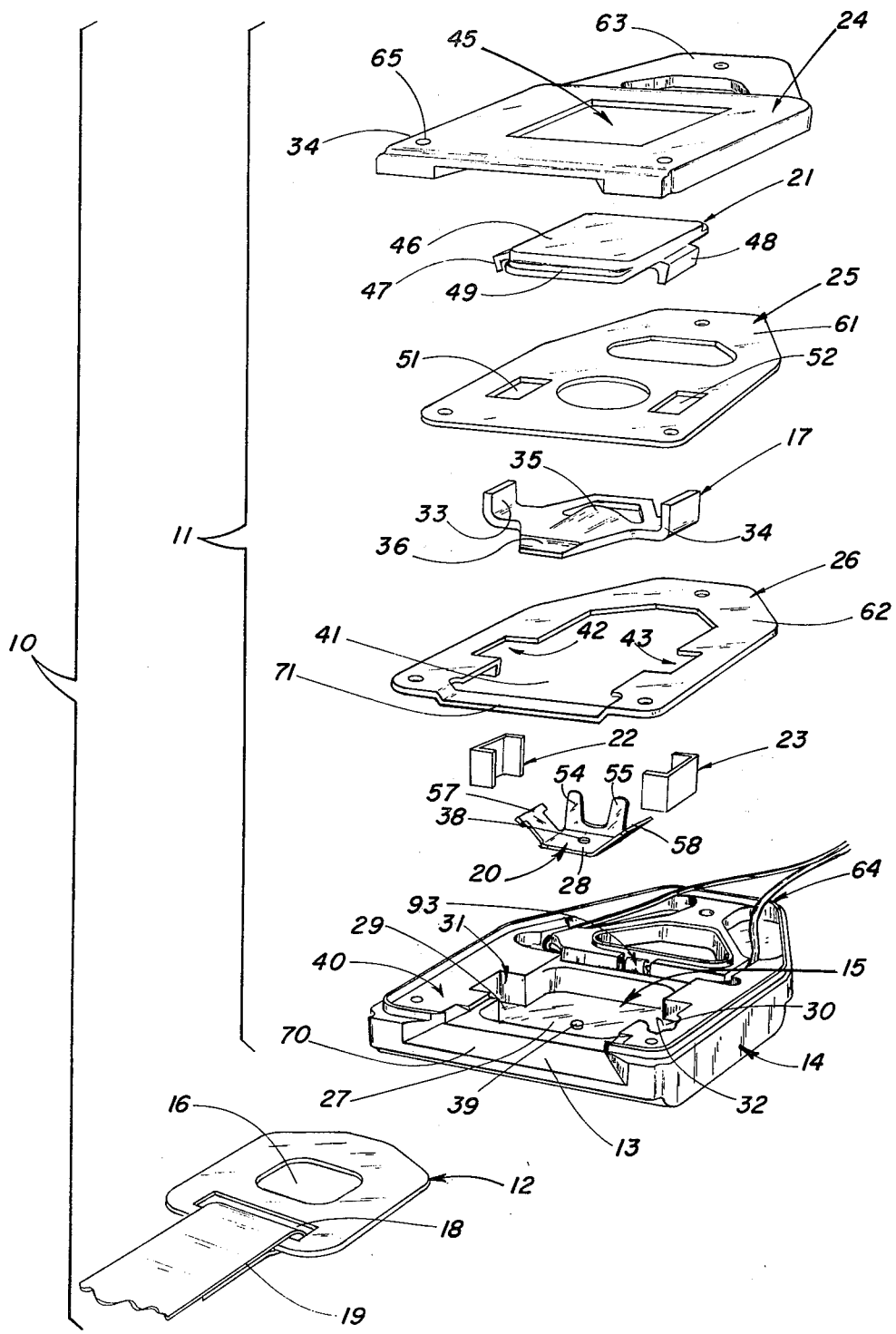
FIG. 1 is an exploded perspective view of a seat belt buckle with tongue incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a seat belt buckle and tongue combination 10 for installation in a vehicle to secure occupants therein. Combination 10 includes a seat belt buckle 11 and a tongue 12 insertable through inlet means 13 of main body 14 and into the cavity 15 of the main body. Tongue 12 is provided with an aperture 16 which is releasably engageable with a spring-biased latch plate 17 slidably mounted vertically within cavity 15. Tongue 12 includes a second aperture 18 through which one end of belt 19 extends being securely fastened to tongue 12.

A double leaf or coil spring 20 is positioned within cavity 15 beneath latch plate 17 so as to urge the latch plate upwardly to engage tongue 12. Spring 20 is yieldable when push button 21 is moved downwardly so as to force the latch plate 17 to disengage tongue 12. Latch plate 17 is slidably mounted in a pair of upright channels 22 and 23 positioned within cavity 15. Cover 24 is fixedly mounted to main body 14 and has a reinforcing plate 25 recessed therein whereas another reinforcing plate 26 is recessed in main body 14.

Main body 14 (FIG. 1) has an open top in which the leaf spring 20, channels 22 and 23, latch plate 17 and reinforcing plate 26 are inserted with the push button 21, plate 25 and cover 24 then being installed on main body 14. The bottom surface 27 of cavity 15 provides a support and location for the base 28 of spring 20 and is at the same level as the bottom surfaces 29 and 30 of channels 31 and 32 which are provided in the opposite sides of the cavity. C-shaped channels 22 and 23 are positioned in channels 31 and 32 of housing 14 and stand upright atop surfaces 29 and 30.

Latch plate 17 is disposed in cavity 15 and has a pair of outwardly-extending arms 33 and 34 which are slidably received in channels 22 and 23. Arms 33 and 34 extend upwardly from the main body of latch plate 17. Projection 35 slopes upwardly from the tapered leading edge 36 of the latch plate to allow tongue 12 to slide into the cavity and over projection 35. The rear edge 37 (FIG. 2) of projection 35 drops sharply so as to prevent disengagement of the tongue from the latch bar until the latch plate is depressed.

Base 28 of leaf spring 20 is provided with hole 38 which receives round protrusion 39 projecting upwardly from surface 27 of cavity 15. Base 28 is positioned atop surface 27 and is secured thereby by projection 39. Upwardly-extending spring-biased arms 57 and 58 extend through the cavity and into channels 22 and 23 beneath latch plate 17 to abuttingly engage the bottom surface of the latch plate. Each arm 57 and 58 extends upwardly at approximately 45° from base 28 and outward into channels 22 and 23. Two small vertical arms 54 and 55 extend vertically from the rear of the spring base 28 to contact tongue 12 and assist in pushing out tongue 12 when latching plate 17 is released. Channels 22 and 23 must be sufficiently spaced apart so as to allow arms 57 and 58 of the leaf spring to be depressed thereby extending further outwardly into the channels 22 and 23. Once tongue 12 is inserted into cavity 15 and is engaged with projection 35 of latch 17, the tongue may not be withdrawn until button 21 is despressed. Lateral force is transferred onto latch plate 17 in the event tongue 12 is pulled in the direction opposite of the buckle without depressing button 21. The lateral force applied to latch plate 17 is transferred to channels 22 and 23, respectively, by arms 33 and 34.

Main body 14 is provided with a recess 40 which is positioned above surfaces 29 and 30. Reinforcing plate 26 is received in recess 40 and is provided with a central aperture 41 through which latch plate 17 moves. A pair of channels 42 and 43 are provided in plate 26 which open into aperture 41. Channels 22 and 23 are press-fitted into channels 42 and 43 thereby insuring that channels 22 and 23 remain upright within cavity 15.

Figure 5:
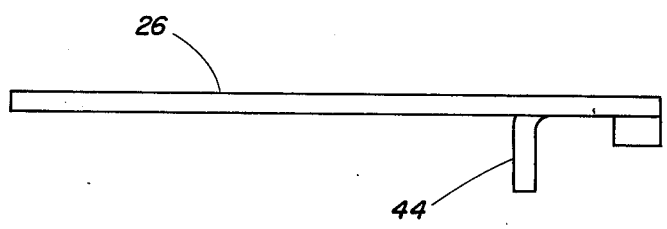
FIG. 5 is a side view of plate 26 shown in FIG. 1.

Plate 26 is provided with a downwardly-extending flange adjacent each channel 42 and 43 which abuts atop surfaces 29 and 30. For example, flange 44 (FIG. 5) extends downwardly from channel 42 (FIG. 1) and abuts atop surface 29 whereas another leg extends downwardly from channel 43 so as to abut surface 30 with both legs supporting plate 26 preventing relative motion between the plate and main body 14. Channels 22 and 23, respectively, fit within channels 42 and 43 and are positioned rearwardly of the flanges. For example, channel 22 is positioned rearwardly of flange 44.

Figure 4:
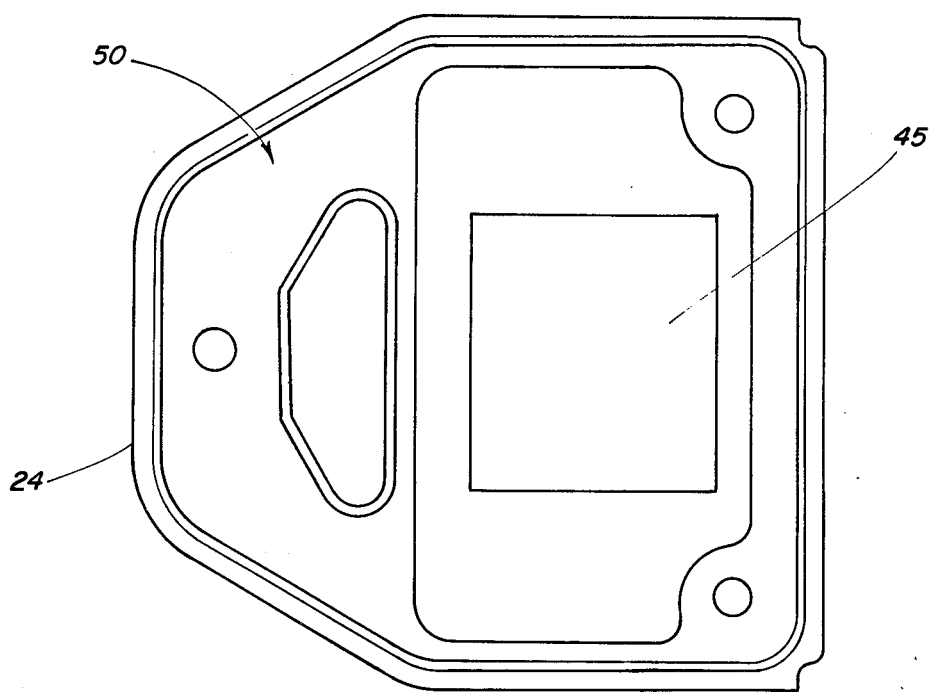
FIG. 4 is a bottom view of the buckle cover 24 shown in FIG. 1.

The top portion 46 of push button 21 projects through aperture 45 of cover 24 when the push button is in the upward position. Button 21 includes a pair of outwardly-extending legs 47 and 48 which extend slidably into channels 22 and 23 against and atop the arms 33 and 34 of latch plate 17. The push button is accessible via aperture 45 to allow the button to be pushed downwardly moving the latch plate and leaf spring downwardly so as to disengage the latch plate from tongue 12. A shoulder 29 extends around the upwardly projecting portion 46 of button 21 preventing the button from falling through aperture 45 of cover 24. The button is positioned between cover 24 and reinforcing plate 25 which is received within recess 50 (FIG. 4) of cover 24. Plate 25 is provided with a pair of rectangular holes 51 and 52 through which, respectively, channels 22 and 23 extend. Holes 51 and 52 are sized relative to channels 22 and 23 so as to tightly grip the channels thereby insuring that the channels remain upright. Recesses 40 and 50 of main body 14 and cover 24 are sized relative to plates 26 and 25 so that plate 26 contacts plate 25 across the entire bottom surface of plate 25 when cover 24 is tightly secured to main body 14. Conventional fastening means such as rivets 53 (FIG. 2) extend through and tightly secure together plates 25, 26 and cover 24 and main body 14. Thus, the lateral force exerted by tongue 12 through latch plate 17 and channels 22 and 23 is applied to plates 25 and 26 which are tightly secured to the main body and cover of the buckle thereby insuring that the lateral force is applied to the entire laminated buckle without stress being applied to any of the plastic parts such as cover 24 or main body 14. Rivets 53 insure that the lateral force is applied evenly through the laminated buckle.

Figure 2:
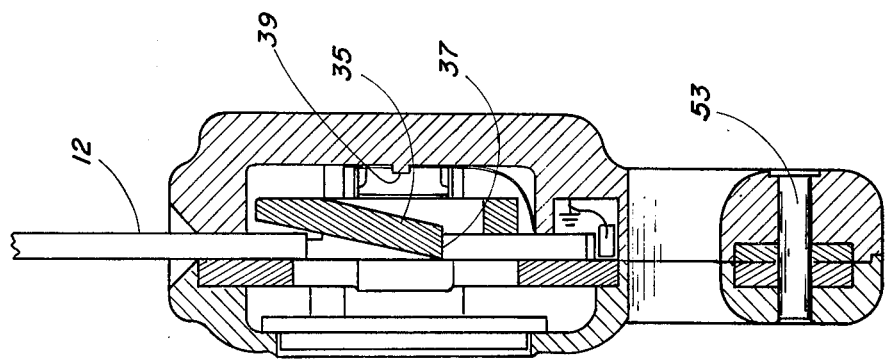
FIG. 2 is a cross-sectional view of the assembled buckle with tongue inserted therein.

Plates 25 and 26 are provided with, respectively, extensions 61 and 62 which are aligned with and positioned between extensions 63 and 64 of cover 24 and main body 14. A belt aperture is provided in each extension to facilitate extending a seat belt through the apertures in order to secure the seat belt to the buckle. Rivets 53 may be extended through a small hole provided in each extension so as to secure the plates, cover and main body together such as shown in FIG. 2. Likewise, additional rivets may be extended through the opposite forward corners 56 (FIG. 1) of cover 24 and likewise through the forward corners of plates 25 and 26 and main body 14 so as to secure the plates, cover and main body together.

Entrance means 13 of main body 14 is formed by recess 40 in main body 14 and the lower edge of cover 24. In addition, the leading edge 71 of plate 26 (FIG. 1) extends downwardly from the main body of plate 26 so as to be positioned inwardly of but aligned with recess 40 of main body 14. Thus, the leading edge 71 of plate 26 provides a guide or lip for the tongue being inserted into cavity 15 and onto latch plate 17. The leading edge 36 of latch plate 17 is positioned inwardly of and aligned with leading edge 71 of plate 26 when the latch plate is in the upward position.

Figure 3:
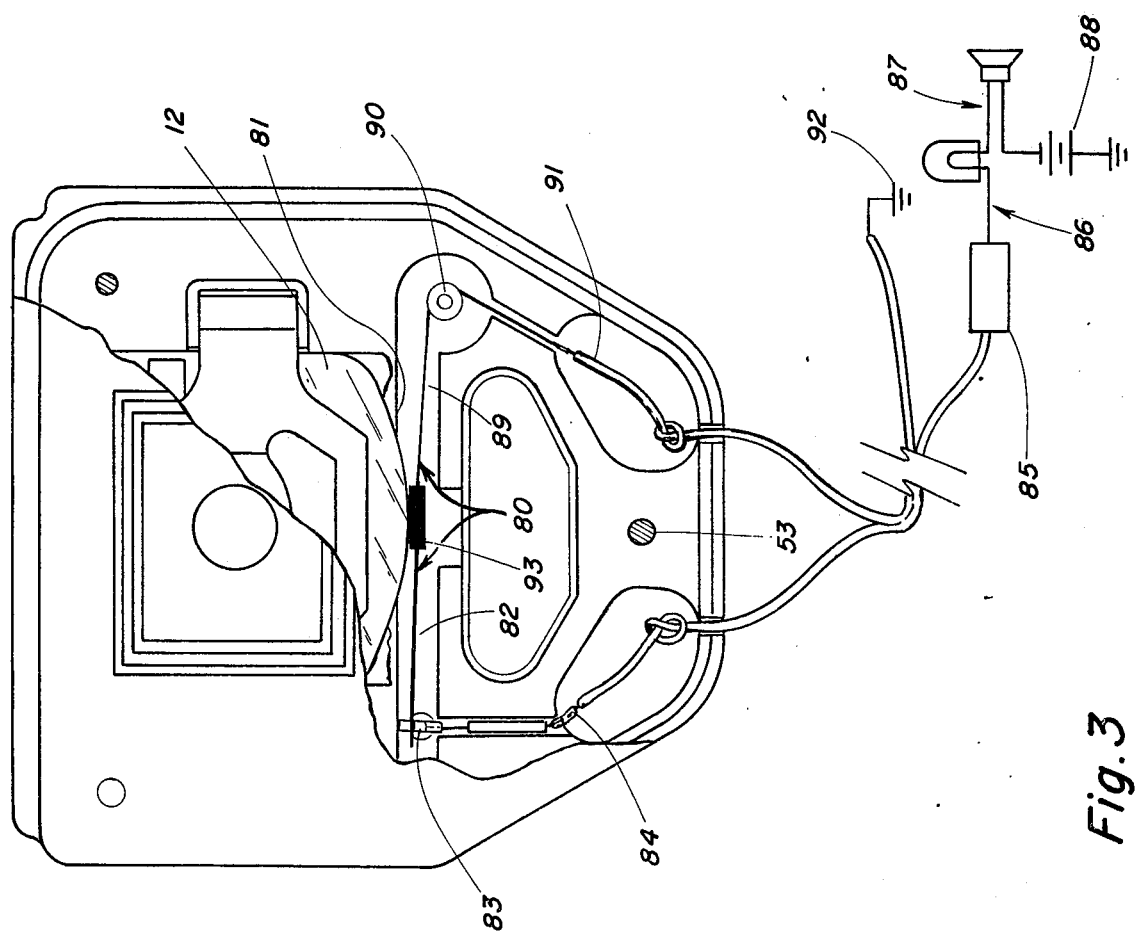
FIG. 3 is a fragmentary top view of the main body of the buckle.

An electrical switch may be mounted within the buckle so as to activate an external alarm whenever the buckle is not engaged with the tongue and when the vehicle ignition is activated. For example, electrical switch arm 80 is shown mounted to main body 14 (FIG. 3) by means 90, such as an insulated rivet, and is engaged by the leading edge 80 of tongue 12. Electrical switch arm 80 includes a silver plated spring contact portion 82 which hits contact 83 when tongue 12 is fully inserted thereby forcing arm 80 rearwardly. Contact 83 is connected to electrical wire 84 extending outwardly of the housing to a suitable ignition sensor 85 and external alarms 86 and 87. Contact 83 is insulated from the buckle housing. External alarms 86 and 87 are connected to a suitable source of electrical energy 88. Likewise, the spring contact arm 80 is connected by means 90 to main body 14 and in turn connected to wire 91 extending outwardly from the main body to a suitable ground 92. The insulated button 93 contacts portion 82 to isolate the switch from buckle tongue 12. Contact arm 82 extends freely in the cavity of body 14. The leading edge 81 of tongue 12 contacts button 93 resulting in the electrical contact between contact arm 82 and contact 83 thereby completing the circuit and deactivating the external alarm, depending upon the controls within ignition control 85. The seat belt buckle disclosed herein may be provided with or without the electrical switch.

Many variations are contemplated and included in the buckle disclosed herein. In one embodiment, the cover and main body were produced from plastic whereas the reinforcing plates 25 and 26 were produced from metal.

The dual-latch form of the buckle shown in FIGS. 6–11 utilizes certain modified components. This embodiment of the buckle assembly is intended for use with special configuration harnesses such as those utilized with infant car seats. The buckle, in these applications, may be attached to a crotch strap with shoulder straps attached to each of twin tongues. The resulting assembly is one which maintains the "load transfer to the reinforcing plates" feature of the initially described embodiment and permits the dual latch plates or tongues to be simultaneously released when the push button is depressed. The tongues are provided with a longitudinally truncated configuration and each has a suitably formed aperture receiving a latching plate catch. In FIGS. 6–11 those parts which are unchanged from their counterparts of FIGS. 1-5 are given reference numerals identical to those used in FIGS. 1-5.

Figure 6:
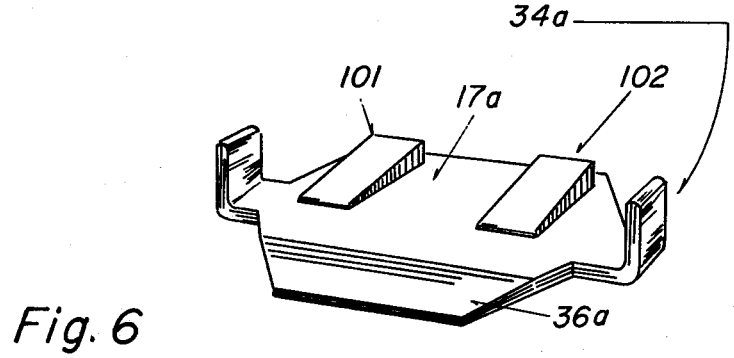
FIG. 6 is a perspective view of a modified form of the latch plate.
Figure 7:
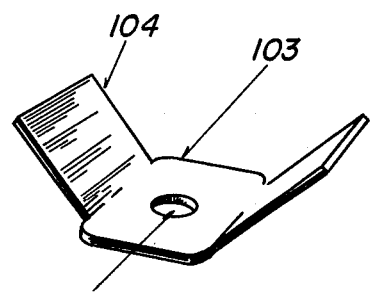
FIG. 7 is a perspective view of a modified form of the leaf spring.
Figure 10:
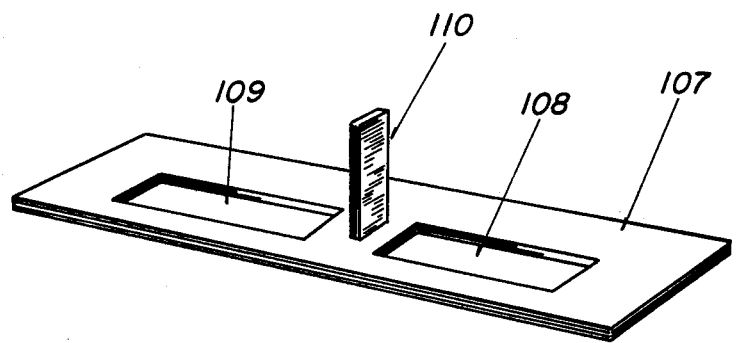
FIG. 10 is a perspective view of the closure plate used with the modified buckle assembly of FIGS. 6-9.
Figure 8:
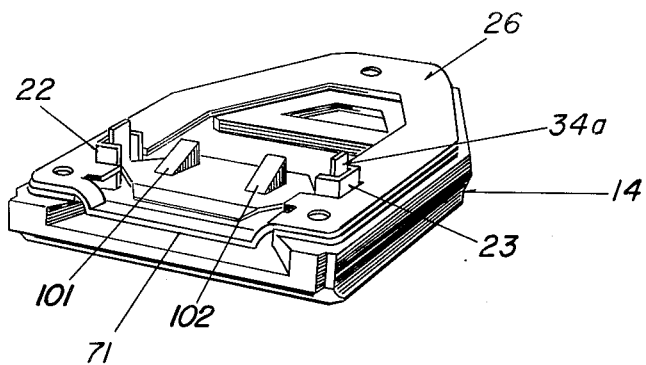
FIG. 8 is a perspective view of the buckle body with the latch plate of FIG. 6 in place.

Referring to FIGS. 6 and 8, the latch plate 17a is provided with arms 24a and two, transversely spaced abutments forming catches 101 and 102. The plate has a bevelled, leading edge surface 26a, comparable to the leading edge 36 of plate 17 of FIG. 1.

As may best be seen in FIG. 8, the dual-catch latch plate 17a is positioned in body 14 with its arms 34a extending through channels 22 and 23 which are seated in the reinforcing plate 26. Not visible in FIG. 8, but underlying the plate 17a is the leaf spring 103 (FIG. 7) which has resilient arms 104 and a locating aperture 106.

Figure 9:
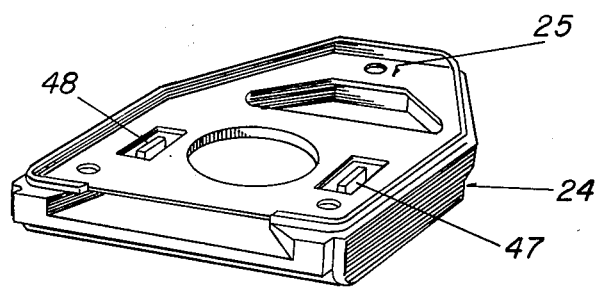
FIG. 9 is a perspective view of the cover component of the buckle with reinforcing plate and push-button in place.

FIG. 9 shows the cover 24, with reinforcing plate 25 positioned therein and overlying the push button 21 whose legs 47 and 48 are visible in FIG. 9. It will be evident from FIGS. 1, 8 and 9 that when the buckle is assembled the cover 24 is placed atop the body 14 with plates 25 and 26 facing each other. The mouth area, providing entry into the body cavity, is completed by a plate 107 (FIG. 10) which has two, edge-aligned openings 108 and 109. The plate 107 is secured by adhesive or any other suitable means across the end face of the buckle. An integral member 110 extends from the inner face of the plate 107 and, when the plate is in place, divides the entry area to the housing cavity. The openings 108 and 109 are aligned with the latch plate catches 61 and 62, respectively, and the member 110 serves as a partition preventing a belt tongue entering one of the openings from being skewed so as to interfere with the adjacent opening or to be cocked with relation to its particular latch plate catch.

Figure 11:
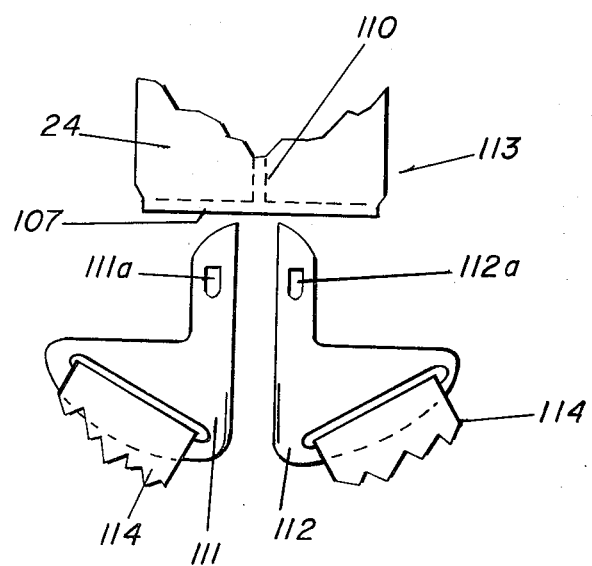
FIG. 11 is a fragmentary top plan view of the dual tongue receiving embodiment of the buckle assembly of FIGS. 6-10.
Figure 12:
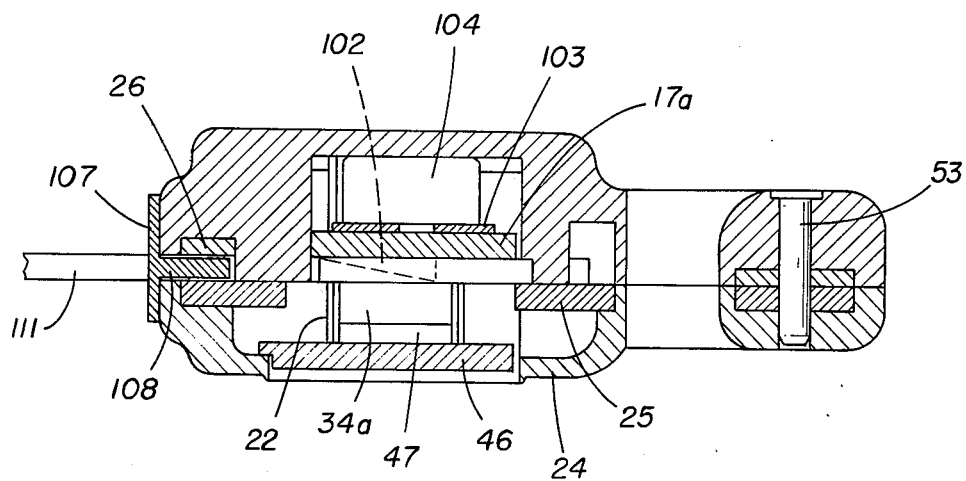
FIG. 12 is a side sectional view of the buckle shown in FIGS. 6-11.

The tongues for use with this modified form of the buckle are shown in FIG. 11 and identified at 111 and 112, the buckle as described with reference to FIGS. 6–10 being indicated generally at 113 in FIG. 11. The tongues are L-shaped and identical in configuration and accommodate straps 114 which extend at an angle to the direction of entry of the tongues into the buckle, the straps 114 serving as shoulder straps in a typical application. The buckle entry portions of the tongues have elongated openings 111a and 112a which have a straight forward margin adapted to engage the vertical face of the latch plate catches 102 and 101, respectively, when the tongues are inserted, individually, into the buckle 113. When the tongues are in place in the buckle their adjacent side margins are generally parallel.

The buckle of FIGS. 6–11 has the load transfer characteristics of the initially described embodiment but accommodates dual tongues. Depressing the push button 46 serves to move the latch plate and to simultaneously and abruptly release both tongues from the buckle.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. In a laminated seat belt buckle comprising a main body member having a cavity therein and a cover member adapted to overlie said body member also having a cavity therein registering with the body cavity, movable latching means for engaging a seat belt tongue and manual operating means accessible at the exterior of the cover member for actuating said latching means, the improvement wherein the the line of junction of said body member and cover member lies in a single flat plane except for opposed offset portions at adjacent ends of the members forming an entry passage for a seat belt tongue into said body member cavity, a first reinforcing plate recessed in the marginal area of said body member and a second reinforcing plate recessed in the marginal area of said cover, said reinforcing plates being contiguous along the line of junction of the body and cover members and generally coextensive with said members, the end portion of said first plate being offset adjacent said entry passage to accommodate entry of a seat belt tongue into said body member cavity, and registering apertures in said plates accommodating said latching means and said operating means.

2. A laminated seat belt buckle as claimed in claim 1 in which said body and cover members are molded of polymeric material and said reinforcing plates are formed of steel.

3. A laminated seat belt buckle as claimed in claim 1 which is adapted to accommodate two separated belt tongues for side-by-side separate insertion into said entry passage, said adaptation being provided by a wall bisecting said entry passage which prevents the tongue in one portion of the entry passage from being skewed into the path of the tongue entering the other portion of the entry passage.

4. A laminated seat belt buckle as claimed in claim 1 in which said cover member reinforcing plate is provided with integral tabs turned outwardly toward the base wall of the cover member, said tabs receiving the load applied to said latching means by the belt tongue.

* * * * *